May 5, 1931. W. G. ESTEP 1,804,093
FLOAT CONTROLLED VALVE
Filed Jan. 15, 1930
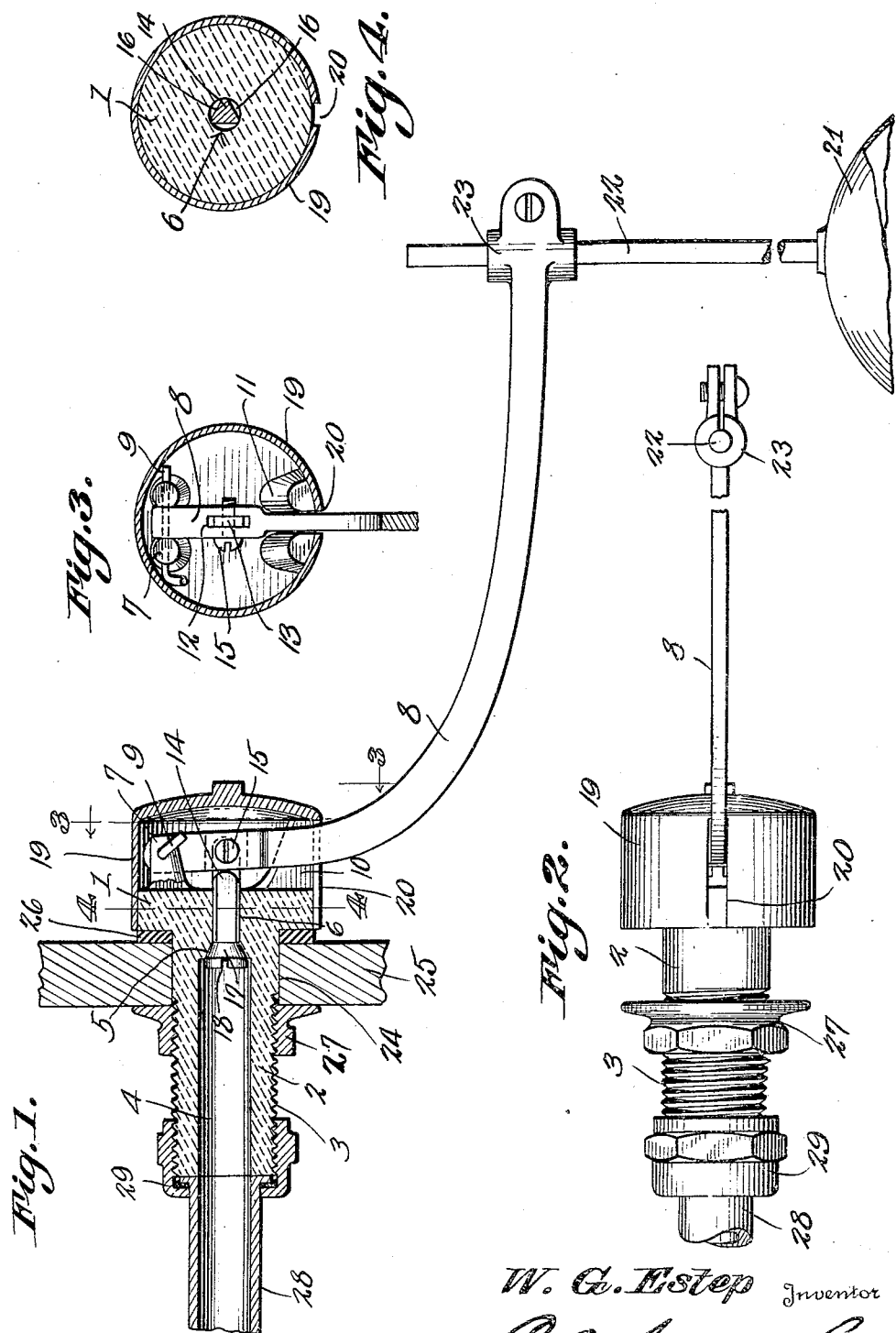
W. G. Estep Inventor Patented May 5, 1931

1,804,093

UNITED STATES PATENT OFFICE

WILLIAM G. ESTEP, OF DUQUESNE, PENNSYLVANIA, ASSIGNOR OF ONE-THIRD TO ROBERT HAWK AND ONE-THIRD TO JOSEPH CONLIN, BOTH OF DUQUESNE, PENNSYLVANIA

FLOAT CONTROLLED VALVE

REISSUED

Application filed January 15, 1930. Serial No. 421,004

This invention relates to a float controlled valve designed primarily for use in flush tanks and the like.

It is an object of the invention to provide a valve the casing of which can be formed of porcelain or the like having integral means for supporting and guiding a float actuated lever used for actuating the valve.

Another object is to provide a valve which will be held to its seat by the elevated float in the tank being supplied with water and also by the pressure of water from the supply pipe.

A further object is to provide a simple and efficient means for protecting the working parts of the valve, this means being easily removable when it is desired to obtain access to said parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a vertical longitudinal section through the valve casing and adjacent parts, a portion of the float being shown connected thereto.

Figure 2 is a bottom plan view of the structure.

Figure 3 is a section on line 3—3, Figure 1.

Figure 4 is a section on line 4—4, Figure 1.

Referring to the figures by characters of reference, 1 designates the body portion of the valve casing which is preferably formed of metal, or procelain, or other strong ceramic material. Extending from this body portion is a tubular stem 2 formed integral therewith and exteriorly screw-threaded as shown at 3. A bore 4 in the stem is provided at its inner end with a tapered seat 5 located at one end of a passage 6. This passage opens through the body portion 1.

Formed on one face of the body portion 1 are spaced lugs 7 between which is mounted one end of an elongated curved lever 8 held to the lug by a pivot pin 9 which extends transversely through them.

Guide ears 10 are formed integral with the body portion 1 at points substantially diametrically opposite the lugs 7 and these ears, which have their free end portions rounded as shown at 11, cooperate to form a guide between which a portion of the lever 8 is adapted to slide.

At a point between the pivot lugs 7 and the guide ears 10 the lever 8 is formed with a slot 12 into which projects the reduced end 13 of a valve stem 14. This reduced end is attached to the lever by means of a transverse screw 15 or other suitable pivot device. The stem is cut away longitudinally as shown particularly at 16 to provide longitudinal clearances between the stem and the wall of the passage 6. At that end remote from the lever the stem 14 is provided with a conical enlargement forming a valve 17 which is adapted to fit snugly against the seat 5. This valve may be formed in its large end with a kerf 18 whereby it is possible to grind the valve to its seat and insure a tight fit.

For the purpose of protecting the pivot lugs, the guide ears, and the adjacent parts, the body portion 1 of the valve casing is provided with a tight fitting cap 19 of a metal which will not corrode and this cap has a slot 20 extending thereinto from its edge within which the lever 8 is adapted to work. The slot is of such length that sufficient clearance is always provided along the lever to permit the flow of water passing through the passage 6 when valve 17 is unseated.

The cap can be held to the body portion 1 by frictional engagement therewith although, under some conditions, it might be advisable to use small screws or the like for holding it in place. Ordinarily, however, the cap is made with sufficient resiliency to cause it to grip the body portion 1 so that it will not become accidentally detached therefrom.

A float, a portion of which has been indicated at 21, can be connected to lever 8 by any suitable means. For example, a stem 22 can be extended from the float and adjustably and detachably seated within a split sleeve 23 provided at one end of the lever 8.

In practice, the stem 2 is inserted into an opening 24 formed in the wall 25 of the tank to be equipped with this invention. A gasket 26 of rubber or other suitable material is arranged on the stem between wall 25 and body portion 1 so that when a nut 27 mounted on the threaded portion of stem 2 is screwed against the wall 25, the washer or gasket 26 will be compressed and prevent leakage. Thereafter a supply pipe 28 can be connected to the stem 2 by a suitable coupling 29.

When the tank to which the device is applied requires filling, the float 21 and that end of the lever 8 to which it is connected will be held at their lower extreme positions. Consequently, lever 8 will thrust against the stem 14 and hold valve 17 unseated. Thus water will be free to flow around the valve and along passage 6 to the interior of cap 19 from which it will escape through the slot 20 into the tank. As the level of the liquid in the tank rises, the float will be gradually elevated and will pull on the end of lever 8. Thus the lever will draw valve 17 toward its seat where it will be held not only by the float operated lever but also by the pressure back of the valve from supply pipe 28.

What is claimed is:

1. A device of the class described including a body portion having a tubular stem opening therethrough, there being a tapered seat in the stem, diametrically opposed pairs of pivot studs and guide ears integral with the body portion, a float-actuated lever pivotally mounted between the lugs and slidable between the ears, a valve adapted to fit snugly upon the seat, a stem projecting therefrom through the body and pivotally connected to the lever at a point between the lugs and ears, and a protecting cap engaging the body portion and housing the lugs and ears and a portion of the lever, there being a slot in the cap in which the lever is movably mounted, said slot constituting a liquid outlet.

2. A device of the class described including a body portion having an integral stem, there being a bore in the stem opening through the body portion and having a tapered seat, tapered lugs integral with the body portion, guide ears integral with the body portion, a lever extending between the ears and between the lugs, a pivot pin extending transversely through the lugs and lever, a float for actuating the lever, a valve adapted to engage the seat, a stem projecting therefrom through the body portion and pivotally attached to the lever, and a protecting cap housing the lugs and ears and gripping the body portion, said cap having a slot through which the lever extends, the pin being held within the pivot lugs by the cap and said slot constituting an outlet for liquid released by the valve when unseated.

3. A device of the class described including a body portion having an integral stem, there being a bore in the stem opening through the body portion and having a tapered seat, tapered lugs integral with the body portion, guide ears integral with the body portion, a lever extending between the ears and between the lugs, a pivot pin extending transversely through the lugs and lever, a float for actuating the lever, a valve adapted to engage the seat, a stem projecting therefrom through the body portion and pivotally attached to the lever, and a protecting cap housing the lugs and ears and gripping the body portion, said cap having a slot through which the lever extends, the pin being held within the pivot lugs by the cap and said slot constituting an outlet for liquid released by the valve when unseated, said body portion and its stem being formed of ceramic material.

4. A device of the class described including a body portion having a tubular stem opening therethrough, there being a tapered seat in the stem, a float actuated lever pivotally connected to the body portion, means on the body portion for sliding engagement by the lever to guide it, a valve adapted to fit snugly upon the seat, a stem projecting therefrom through the body and pivotally connected to the lever adjacent to the guiding means, and a protecting cap engaging the body portion and housing said guiding means and the adjacent portion of the lever, there being an opening in the cap in which the lever is movably mounted, said opening constituting a liquid outlet.

In testimony that I claim the foregoing as my own, I have hereto affixed my signature.

WILLIAM G. ESTEP.